2,993,888
PROCESS FOR THE REACTION OF ISOCYANATES WITH CELLULOSE IN THE PRESENCE OF ORGANIC PHOSPHITES

Clark M. Welch, New Orleans, La., assignor to the United States of America as represented by the Secretary of Agriculture
No Drawing. Filed June 1, 1960, Ser. No. 33,349
6 Claims. (Cl. 260—224)
(Granted under Title 35, U.S. Code (1952), sec. 266)

A non-exclusive, irrevocable, royalty-free license in the invention herein described, through the world for all purposes of the United States Government, with the power to grant sublicenses for such purposes, is hereby granted to the Government of the United States of America.

This invention relates to the reaction of organic isocyanates with cellulose to form N-substituted cellulose carbamates. The reaction may be formulated as follows:

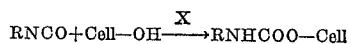

$$\text{RNCO} + \text{Cell-OH} \xrightarrow{X} \text{RNHCOO-Cell}$$

Here R is an organic radical, Cell-OH is a portion of the cellulose chain, and X is an accelerating agent which chemically activates one or both of the reactants or which physically swells the cellulose to render it more accessible to the isocyanate, or which serves as both an activator and a swelling agent.

In the past, the preferred accelerating agent has been pyridine (Schneebeli, Compt rend. 234 738 (1952); 236 1034 (1953)) alone or in conjunction with metal salts such as zinc chloride (Schnell, Ger. 824,039). Dimethylformamide has been reported to be even more effective (Pikl, U.S. 2,668,168). The above reaction has commonly been run at temperatures in the range of 50–160° C.

Serious difficulties have been encountered in obtaining useful textile materials in this manner. In pyridine the reaction is slow, and even with aryl isocyanates, which are among the more reactive isocyanates, the process often has required 20–40 hours to reach the desired degree of substitution of the cellulose (Hearon, Hiatt and Fordyce, J. Am. Chem. Soc. 65 829, 1953; Georges and Hamalainen, U.S. 2,428,843). With the lower alkyl isocyanates refluxed at atmospheric pressure, even moderate degrees of substitution have been difficult to obtain on cotton cellulose, which is of greater molecular weight and lower reactivity than other forms of natural, regenerated or substituted cellulose. With either pyridine or dimethylformamide as the solvent, it has also been difficult to carry out the reaction on cotton cellulose without degradation and depolymerization of the cellulose occurring. This degradation causes weakening and embrittlement of the fibers followed, as the reaction proceeds, by actual solution of the material in the reaction solvent, with loss of the original fiber and textile properties of the cotton (Pikl; Hearon, Hiatt and Fordyce; Schnell; Schneebeli, op. cit.).

The present invention in large measure overcomes these difficulties by the use of a new class of catalysts, the alkyl phosphites having the formula $R_1R_2R_3PO_3$. Here $R_1$, $R_2$, and $R_3$ are preferably straight-chain alkyl groups, or less preferably, branched alkyl groups, and have between one and egiht carbon atoms each. One of the R groups may however be hydrogen, in which case the other R groups are alkyl groups, preferably having one to two carbon atoms each. The effect of these catalysts is to accelerate greatly the reaction of the isocyanates with the cellulose without a corresponding acceleration of undesired degradation reactions.

The reaction is advantageously run in pyridine or dimetyhlformamide solution at temperatures of 50 to 160° C. or conveniently at the reflux temperature of the solution. Reaction times of 4 minutes to 7 hours may be required to obtain high degress of substitution, depending upon the conditions used. With the alkyl isocyanates, which are of relatively low reactivity, dimethylformamide is somewhat preferable as the solvent since it has a higher boiling point than pyridine and consequently permits the use of higher reaction temperatures at atmospheric pressure. However, it is not necessary to use a swelling solvent as the reaction medium if the cellulose is first swollen by mercerization with 15–30% sodium hydroxide and the water is subsequently extracted from it with a water-miscible ether, ketone or tertiary amine, prior to carrying out the reaction. Any diluent may then be used as the reaction medium, provided it is one which does not react with the isocyanate, the phosphite or the cellulose. With the pre-swollen cellulose, suitable diluents for the isocyanate and phosphite are aliphatic and aromatic hydrocarbons, ethers and esters. After the reaction has been carried out to the desired degree of substitution, the cellulose is freed of excess isocyanate and of organic phosphite by conventional washing methods. Analyses for phosphorus showed that no phosphate remains in the cellulose.

The degree of acceleration obtained with the organic phosphites varies with the particular isocyanate and phosphite used, as well as with the concentration of the phosphite. With aryl isocyanates tht rate of reaction becomes so great that a point is soon reached at which further increases in catalyst concentration do not further increase the rate. The swelling rate of the cellulose then appears to become the limiting factor. The N-arylcarbamoyl groups being introduced require a relatively large volume within the fiber; hence the need for rapid swelling. A much higher reaction rate is realized by pre-swelling the cellulose prior to reaction.

The organic phosphites showing the greatest catalytic effect are those of low molecular weight. The preferred catalysts are trimethyl phosphite, triethyl phosphite and dimethyl hydrogen phosphite. The trialkyl phosphites may be used at concentrations of 0.1 to 30% by volume. They are more effective at a given concentration than the corresponding dialkyl hydrogen phosphites. The latter are known to react reversibly with isocyanates, and at concentrations higher than 5% by volume, the dialkyl hydrogen phosphites tend to retard the desired reaction between the isocyanate and the cellulose, presumably by removal of the isocyanate. Aryl phosphites appear to be ineffective as catalysts.

The above process has been applied to cotton cellulose in yarn and fabric form as well as to cotton fiber. It is desirable that the cotton be purified prior to treatment. The conventional methods of scouring or kier-boiling provide adequate purification.

Useful properties imparted by the process described here include in several cases an increase in the breaking strength of the treated yarns, whereas a decrease in strength was observed when the phosphite catalysts were not used. A large gain in extensibility was imparted to the yarns, the elongation at break frequently being double that obtained in the absence of phosphites or that shown by untreated yarn. The elongation was found to increase with increasing degrees of substitution; and also with increasing tensile strength of the yarn. A property invariably imparted, and one which is totally lacking in untreated cotton, is that of dyeability by acetate dyes. Very deep dyeing was obtained even at an average degree of substitution as low as 0.30 group introduced per anhydroglucose unit, in some cases.

A further property obtained in the present process is greatly increased resistance of the cotton to attack by mineral acids such as 97% sulfuric acid. The stability of the treated yarns increased with increasing degrees of substitution, and was therefore greatly enhanced by the use of phosphite catalysts. This effect has been observed with all the isocyanates which underwent reaction, and appeared to be greatest, at a given degree of substitution, for those isocyanates of highest molecular weight. The cottons are thus rendered suitable for the manufacture of garments considerably resistant both to mineral acids and organic solvents.

The following examples illustrate the use of organic phosphites as catalysts for the preparation of cellulose carbamates.

*Example 1*

A solution of 20 ml. of n-propyl isocyanate, 4.0 ml. of trimethyl phosphite and 36 ml. of pyridine was heated to boiling in an Erlenmeyer flask fitted with a reflux condenser. To the flask was then added a 2.693 g. skein of 12/3 scoured filling yarn (7.46 twists per inch) which had been dried at 115° C. for one hour. Glass beads were added to keep the yarn below the surface of the solution. Refluxing was maintained for four hours during which the yarn swelled greatly. The flask was chilled in an ice bath, benzene was added, and the solution was poured off. The yarn was rinsed twice in benzene and boiled in benzene for 5 minutes to remove unreacted propyl isocyanate. It was similarly washed with acetone and then with methanol. The yarn was washed in cold running water and then in hot running water, causing it to deswell considerably. It was oven-dried and then equilibrated at room temperature and ordinary humidity.

The yarn showed a weight gain of 80.1% corresponding to the introduction of 1.52 N-propylcarbamoyl groups per anhydroglucose unit. It contained 7.19% nitrogen (dry basis), corresponding to a degree of substitution of 1.48 groups per anhydroglucose unit. Yarn treated as above with 33% by volume of n-propyl isocyanate in pyridine in the absence of trimethyl phosphite showed only a 6.8% weight gain and a nitrogen content of 1.08% (dry basis), both values corresponding to a degree of substitution of 0.13. Thus the catalyst increased the extent of reaction by more than tenfold in the given reaction period.

The yarn treated in the presence of the catalyst showed a breaking strength of 6.55 lbs. and an elongation at break of 18.8% by A.S.T.M. method D 180–57T (single strand). Yarn treated in the absence of catalyst had a breaking strength of 5.74 lbs. and an elongation of 9.33%. Untreated yarn had a breaking strength of 5.68 lbs. and an elongation at break of 8.9%. It is seen that the increased reaction produced by the catalyst increased both the breaking strength and the extensibility of the yarn. It also imparted an increased affinity for acetate dyes. A hot aqueous suspension of Celliton Fast Blue BA dyed yarn which had been treated in the presence of catalyst an intense blue. Yarn treated in the absence of catalyst was dyed light blue, and untreated yarn was undyed.

*Example 2*

The procedure of Example 1 was repeated using dimethylformamide in place of pyridine and a reflux period of 3 hours instead of 4 hours. With the trimethyl phosphite present, the cotton increased in weight by 76.1% corresponding to a degree of substitution of 1.45. With the phosphite absent, the weight gain was only 10.7%, corresponding to a degree of substitution of 0.20. The extent of reaction was thus mutiplied sevenfold by the trimethyl phosphite. The resulting yarns were of good whiteness and were free of discoloration.

*Example 3*

Twenty milliliters of n-butyl isocyanate were used in place of the n-propyl isocyanate in the procedure of Example 1, and the reflux period was 2 hours instead of 4 hours. The yarn showed a gain in weight of 113%, which corresponds to a degree of substitution of 1.85. It contained 7.53% nitrogen (dry basis) corresponding to a degree of substitution of 1.87. Yarn treated in the absence of trimethyl phosphite catalyst showed a weight gain of only 5.2% in the same time, and its nitrogen content was only 0.93% (dry basis), showing that it had reached a degree of substitution of only 0.085–0.116. Thus the catalyst increased the extent of reaction by about nineteen fold in the reaction time used. Repetition of the experiment with only 0.84% by volume of trimethyl phosphite (or one-eighth the concentration used above) changed the weight gain to 20.3%, which is still four times that obtained with no catalyst.

The yarn treated in the presence of 6.7% by volume of catalyst showed a breaking strength of 6.4 lbs. and an elongation at break of 16.2%. Yarn treated in the absence of catalyst had a breaking strength of only 4.04 lbs. and an elongation of 7.03%. The data for untreated yarn were given in Example I. Clearly the use of the trimethyl phosphite produced increased strength and stretch in the yarn. The N-butylcarbamoyl groups introduced in the cotton increased the affinity of the latter for acetate dyes to an even greater extent than did n-propylcarbamoyl groups. A hot aqueous suspension of Celliton Fast Blue BA dyed the yarn which had been treated in the presence of trimethyl phosphite catalyst an extremely dark shade of blue. Yarn treated without the trimethyl phosphite was dyed a medium shade of blue. Untreated yarn remained undyed.

Samples of these yarns were covered with 97% sulfuric acid and allowed to stand in stoppered test tubes. The yarn treated in the presence of trimethyl phosphite remained intact for 1½ to 2 hours at room temperature. Yarn treated in the absence of trimethyl began to disintegrate in 4–5 minutes, as did also the untreated yarn.

*Example 4*

A solution of 25 ml. of phenyl isocyanate, 0.62 ml. of trimethyl phosphite and 50 ml. of pyridine was heated to boiling in an Erlenmeyer flask fitted with a reflux condenser. To the flask was then added a 1.857 g. skein of 12/3 scoured filling yarn which had been dried at 115° C. for one hour. Glass beads were added to keep the yarn from swelling out of the solution. Refluxing was maintained for 15 minutes. The flask was quickly chilled in an ice bath to stop the reaction. The liquid phase was diluted with benzene and decanted. The yarn was washed free of unreacted phenyl isocyanate, dried and equilibrated by the procedure of Example 1.

The yarn showed a weight gain of 75.1%, corresponding to a degree of substitution of 1.02. Its nitrogen content of 5.29% (dry basis) corresponds to a degree of substitution of 1.11. Yarn treated in the same way without any trimethyl phosphite showed a weight gain of 21.1% and a nitrogen content of 2.28%, corresponding to a degree of substitution of 0.29–0.33. Thus the presence of only 0.82% by volume of the catalyst more than tripled the extent of reaction in the given period. The treated yarns were white and unstained.

The introduction of N-phenylcarbamoyl groups greatly increased the affinity of the cotton for various dyes. Hot aqueous suspensions or solutions of Celliton Fast Blue BA, Celliton Fast Yellow RRA or methylene blue dyed the treated yarn whereas untreated yarn was undyed.

*Example 5*

The procedure of Example 4 was followed using 12/3 scoured filling yarn which had not been oven-dried but which was in equilibrium with air at ordinary humidity. Using a 15 minute reflux period as above, the gain in weight shown by the yarn was 97.1%, corresponding to a degree of substitution of 1.32. The nitrogen content was 5.90% (dry basis), corresponding to a degree of substitution of 1.38. The phosphorus content was only 0.007%, showing that the catalyst does not remain in the cotton. In the absence of trimethyl phosphite, the weight gain was only 26.1% which corresponds to a degree of substitution of only 0.36. The nitrogen content of 2.52% (dry basis) corresponds to a degree of substitution of 0.37. Thus the catalyst almost quadrupled the extent of reaction in the time allotted.

Repetition of the experiment with only half as great a concentration of phenyl isocyanate gave, with trimethyl phosphite present, a weight gain of 65%. In the absence of catalyst the weight gain was 27%. Thus the catalyst is effective at various concentrations of phenyl isocyanate.

Trimethyl phosphite concentrations in the range of 0.5–16.6% by volume all gave essentially the same acceleration with phenyl isocyanate, in contrast to the results with butyl isocyanate. However, a catalyst concentration as low as 0.17% by volume gave only one-third this acceleration. The phosphorus content of these yarns was 0.006–0.007% or nearly the same as the value of 0.005% obtained without the phosphite catalyst.

*Example 6*

A 4.404 g. skein of 12/3 scoured filling yarn was mercerized in 20% sodium hydroxide for 15 minutes, washed in cold running water 15 minutes, washed in hot running water 15 minutes, and soaked in four portions of pyridine for 15 minutes each to remove the water from the cotton without deswelling it. The pre-swollen yarn was then added to hot phenyl isocyanate-trimethyl phosphite-pyridine as in Example 4. Enormous swelling occurred during the 15-minute reaction period, but the yarn remained intact and retained its construction and fibrous form. The weight gain was 202%, corresponding to a degree of substitution of 2.75. The nitrogen content (dry basis) of 7.94% corresponds to a degree of substitution of 2.83. The phosphorus content of 0.005% was no greater than that of the control. In the absence of catalyst the pre-swollen yarn showed a weight gain of 104% and a nitrogen content of 6.04% (dry basis) corresponding to a degree of substitution of 1.41–1.44.

The yarn treated in the presence of trimethyl phosphite retained its form, structure and insolubility when placed in boiling organic solvents such as benzene, methanol, pyridine, acetone, and dimethylformamide. This shows that the degree of polymerization of the cellulose molecules was not greatly decreased, and that the catalyst had little if any degradative effect on the cellulose even while 92–94% of the cellulosic hydroxyl groups were being substituted.

The treated yarns showed a resistance to attack by sulfuric acid similar to that demonstrated in Example 3.

*Example 7*

The procedure of Example 6 was repeated using toluene in place of pyridine as the solvent for the phenyl isocyanate and trimethyl phosphite. The yarn showed a gain in weight of 76.5%. In the absence of trimethyl phosphite, the gain in weight was 33.2%. Thus the catalytic effect described herein is not contingent upon the use of a catalytic or swelling solvent.

*Example 8*

Scoured Rowden cotton fiber, dried for one hour at 115° C., was treated as in Example 4. The gain in weight by the cotton was 51.5% with the trimethyl phosphite present at a concentration of 0.067 M. The weight gain was only 12.2% with no catalyst.

The experiment was repeated using other phosphites in place of trimethyl phosphite, at a concentration of 0.067 M. With triethyl phosphite, tributyl phosphite, triisopropyl phosphite and trioctyl phosphite, the weight gains shown by the cotton were 41.5%, 33.0%, 23.8% and 17.1%, respectively. Thus these substances also have a catalytic effect.

*Example 9*

Scoured Rowden raw cotton dried for one hour at 115° C. was treated with a solution containing 38% by volume of phenyl isocyanate and varying concentrations of dimethyl hydrogen phosphite in pyridine, using the procedure of Example 4. At phosphite concentrations of 0.033 M, 0.067 M, and 0.201 M, the observed weight gains were, respectively, 37.0%, 37.3%, and 18.9%. In the absence of catalyst the gain in weight of the cotton was 12.2%. As shown here, dimethyl hydrogen phosphite has a catalytic effect but the use of too high a concentration of this material leads to a decrease in the rate of reaction from the optimum value.

The use of diethyl hydrogen phosphite (0.067 M) as the catalyst resulted in a weight gain of 15.6%, or an increase of 28% over the add-on shown by the control.

*Example 10*

A 2.353 g. skein of 12/3 scoured filling yarn mercerized and pyridine-extracted as in Example 6 was treated with n-propyl isocyanate and trimethyl phosphite as in Example 1, a reflux period of 7 hours being used. A weight gain of 146% was observed, corresponding to a degree of substitution of 2.79. Although greatly swollen, the yarn retained its original fibrous form and construction. The individual fibers showed no sign of fusing together during the process, and they remained insoluble in boiling dimethylformamide, even though 93% of the cellulosic hydroxyl groups were replaced by N-propylcarbamoyl groups. The yarn showed unusual resistance to attack by 97% sulfuric acid, more than two hours being required for dissolution at room temperature.

We claim:
1. A process comprising reacting cellulose with an organic isocyanate in an inert solvent in the presence of about from 0.1% to 30%, by volume, of a phospshite represented by a formula selected from the group consisting of $R_1R_2R_3PO_3$ and $R_1R_2HPO_3$ wherein $R_1$, $R_2$ and $R_3$ are alkyl groups having from 1 to 8 carbon atoms, to produce a cellulose carbamate characterized in that it has increased extensibility and increased resistance to attack by mineral acids and organic solvents over untreated cellulose, and is capable of being dyed by acetate dyes.

2. The process of claim 1 wherein the phosphite is trimethyl phosphite.

3. The process of claim 1 wherein the phosphite is triethyl phosphite.

4. The process of claim 1 wherein the phosphite is dimethyl hydrogen phosphite and it is present in about from 0.1% to 5%, by volume.

5. The process of claim 1 wherein the phosphite is diethyl hydrogen phosphite and it is present in about from 0.1% to 5%, by volume.

6. The process of claim 1 wherein the cellulose is mercerized and the phosphite is trimethyl phosphite.

References Cited in the file of this patent
UNITED STATES PATENTS

| | | |
|---|---|---|
| 2,303,364 | Schirm | Dec. 1, 1942 |
| 2,668,168 | Pikl | Feb. 2, 1954 |
| 2,768,154 | Unruh | Oct. 23, 1956 |

OTHER REFERENCES
JACS, vol. 65, 1943, pp. 829–833.